Dec. 16, 1952     C. A. BRELSFORD     2,621,420
CENTER FINDER AND INDICATOR
Filed Nov. 28, 1949     2 SHEETS—SHEET 1
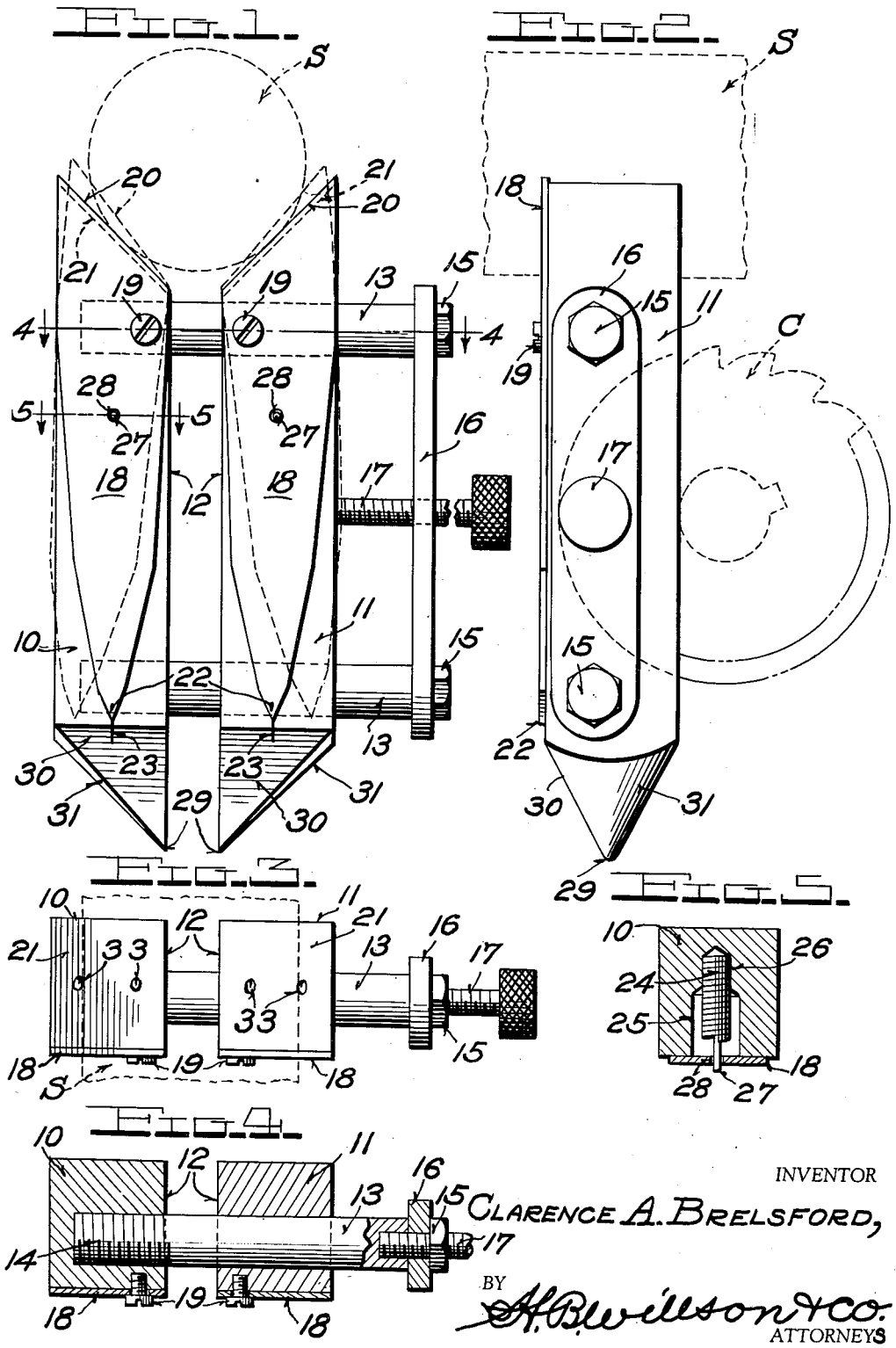
INVENTOR
CLARENCE A. BRELSFORD,
BY
H. B. Willson & Co.
ATTORNEYS

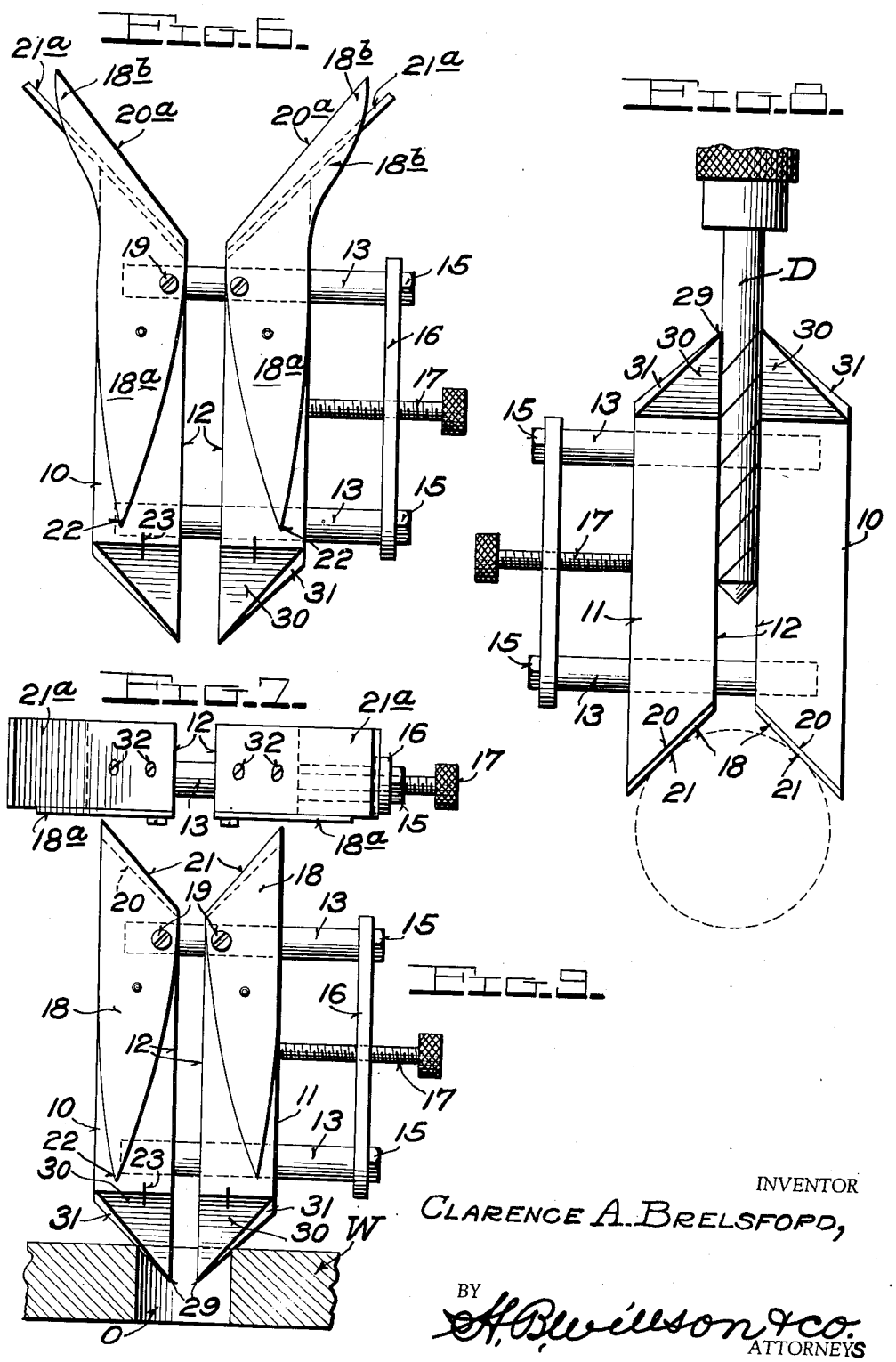

Patented Dec. 16, 1952

2,621,420

UNITED STATES PATENT OFFICE 2,621,420

CENTER FINDER AND INDICATOR

Clarence A. Brelsford, Grants Pass, Oreg.

Application November 28, 1949, Serial No. 129,755

7 Claims. (Cl. 33—185)

My invention relates to tools used by machinists for centering one mechanical element with respect to another.

The tool is an improved center-finder or indicator which is particularly useful on a milling machine to get the cutter centered on the work before starting the cut, where a key seat is to be formed in a shaft, but which may be used in other ways such as on a drill to center the work before drilling.

One object of the invention is to provide a simple, practical and inexpensive device of this character which will enable the centering operation to be more accurately and readily performed.

Another object of the invention is to provide a centering device or gauge of the above character which may be temporarily clamped to opposite sides of a cutting tool and which carries movable feelers or indicators engageable with the work for visually indicating when the latter is correctly centered with respect to the tool so that the centering operation may be more quickly, easily and accurately performed.

A further object is to provide a device of the above character with which additional or extension parts may be used when a cutting tool is to be centered with respect to larger pieces of work such as gears or gear blanks.

With the above and other objects and advantages in view the invention resides in the novel combinations and arrangements of parts, and in the novel features of construction as will be understood from the following description, in connection with the accompanying drawings in which:

Fig. 1 is a front elevation of the preferred form of the invention;

Fig. 2 is a side or edge view;

Fig. 3 is a top or end view;

Figs. 4 and 5 are sectional views taken respectively on the lines 4—4 and 5—5 of Fig. 1;

Fig. 6 is a view similar to Fig. 1 showing additional and substituted parts to adapt the device for use in connection with larger pieces of work;

Fig. 7 is a top view of the device shown in Fig. 6;

Fig. 8 is a side view showing the use of the device of Fig. 1 in centering a drill with respect to a shaft; and Fig. 9 is a side view showing how the device may be used to center a milling cutter with respect to an opening in a piece of work in which a groove is to be cut in one face diametrically of the opening.

The device comprises a pair of parallel elongated body members 10 and 11 movable toward and from each other to receive and clamp a cutting element or tool between them. The clamping members are here shown in the form of rectangular blocks, preferably of metal, between the flat inner or opposed faces 12 of which may be inserted a cutter such as a milling tool C as shown in Fig. 2 or a drill D as seen in Fig. 8. The body member 11 is adjustable slidably toward and from the other member or block 10 by forming it with longitudinally spaced bores to receive parallel guiding stems 13 located adjacent the ends of the member 10. These stems may be cylindrical rods screw threaded into the body 10, as at 14 in Fig. 4, their opposite ends being connected by screws or other fastening means 15 to a clamp-carrying bar 16. A clamping screw 17 is threaded through a central opening in the bar 16 and has at its outer end a finger piece or knob which may be turned to move the member 11 on the guides 13 and thus positively force the faces 12 against opposite faces or sides of a cutting tool to rigidly clamp the device on the tool. The guide rods 13 are preferably off-set with respect to the centers of the body members as seen in Fig. 4, that is, they are disposed closer to the front side faces of the members so that drills of larger diameters may be clamped between the faces 12.

In the preferred embodiment I mount on the flat front faces of the body members a pair of work-engaging feelers or indicating members 18 which permit the centering operation to be more accurately and quickly performed. The front faces are in the same plane and are at right angles to the faces 12. The feelers or indicators 18 are in the form of flat, elongated metal plates disposed in opposed relation against the flat front faces of the body members and pivoted thereto by suitable pivots such as screws 19. The pivots 19 are located adjacent to the clamping faces of the body member and adjacent to the upper end edges 20 of the indicators as seen in Fig. 1. These ends 20 on the two indicators 18 are arranged in outwardly diverging relation preferably at an angle of about 90° to each other and at all times project slightly beyond the correspondingly diverging end faces 21 of the two body members 10 and 11. In prior center-finders of this type the ends 21 were used to engage the work in the centering operation, but I use them to facilitate the positioning of the device substantially perpendicular to the axis of the shaft or other work piece. The opposite or lower portions of the indicators 18 are reduced in width and are preferably tapered to points 22 which are adapted to coact with center marks 23 on the lower portions of the front faces of the body members. The construction and arrangement is such that when the pointers 22 are in registration with the marks 23, a line bisecting the angle between the work-engaging ends 20 of the indicators will pass through the axial line of the milling cutter C clamped between the body members. The feelers or indicators are normally held in their dotted line positions shown in Fig. 1 by suitable spring means such as shown in Fig. 5. In the latter a stiff coil spring 24 is disposed in a recess 25 in the body member with the inner end of the spring fixed in a reduced socket 26. The free end 27 of the spring is straight and extends into a socket-like hole or opening 28 in the portion of the indicator which overlies the socket 25. It will be seen that when a piece of work such as a cylindrical shaft S is moved against the ends 20 of the feelers, the latter will be swung on their pivots 19 against the tension of the springs 24. Thus with the device clamped on the cutter C, the curved surface of the shaft S is brought into engagement with the ends 20 and the shaft then shifted until the pointers 22 are in alinement with the marks 23. At that time the cutter will be centered with respect to the shaft. These parts are exposed so that they may be readily observed and thus the centering operation may be more quickly, easily and accurately performed. The shaft is then fixed and the device removed from the cutter. Substantially the same operation is performed when the device is used to center a drill D with respect to a shaft or other piece of work as will be understood upon reference to Fig. 8.

The device may be used for various other centering jobs such as checking tail stock centers since by placing the tool at the head stock it will indicate where the tail stock center is in relation to the head stock center. It can also be clamped on drill or end mills to find center. It is usable on pieces of work that are of other shape than cylindrical. In Fig. 9 is shown a use of the tool in which the feelers are not employed. By shaping the lower ends of the body members 10 and 11 as shown a milling cutter between said members may be centered to cut a groove across an opening O in the face of a flat piece of work W. That is permitted by forming the lower ends of the members 10 and 11 with opposed symmetrical points 29 adapted to project into the opening O. These centering points are formed by inwardly and downwardly beveling the front and rear faces of the members to form flat converging triangular areas 30 and by downwardly and inwardly beveling the outer side faces of the members to form triangular areas 31 which are transversely curved to form portions of a cone and which are adapted to engage opposite portions of the opening O. The surfaces 30 and 31 on each member converge to a blunt point terminating at the transverse center of the lower extremity of one of the flat faces 12.

At times it is desirable to center a cutter with respect to a large piece of work such as a gear or gear blank. While the work-engaging ends 20 of the indicators 18 may be made longer than shown in Fig. 1, I propose to supply with the device additional parts which may be used when a cutter is to be centered with respect to a large work piece. In Figs. 6 and 7 are shown feelers 18ᵃ which differ from the feelers 18 only in that their upper portions have lateral extensions 18ᵇ to form work engaging end edges 20ᵃ which are much longer than the ends 20. By removing the pivot screws 19, these enlarged feelers 18ᵃ may be substituted for the smaller ones. I also detachably secure to the diverging upper ends 21 of the members 10 and 11 rectangular extension plates 21ᵃ. These plates have apertures to receive fastening screws 32 which enter threaded openings or holes 33 formed in the end faces 21. In other respects the device of Figs. 6 and 7 is the same as the structure first described, and the same reference characters have been used in the drawings.

It will be noted that in both Figs. 1 and 6 the construction is such that the work engaging ends 20 and 20ᵃ will not be prevented from contacting with the work by the diverging ends 21 and 21ᵃ, but that the latter will assist in positioning the device substantially perpendicular to the axis of the shaft S, since the surfaces 21 and 21ᵃ are much wider than the width or thickness of the indicator plates 18 and 18ᵃ. It will be further noted that the use of the spring pressed feelers with their pointers 22 coacting with the center marks 23 will enable the user to more accurately and more readily perform the centering operation since the parts 22, 23 are easily seen.

Excellent results have been obtained from the details disclosed and they are preferably followed, but it will be understood that within the scope of the invention as claimed, numerous minor changes may be made.

I claim:

1. In a device of the character set forth, the combination with a centering device having two elongated body members with substantially flat opposed faces between which a tool may be clamped and other flat faces disposed in the same plane which is at right angles to said opposed faces, said body members also having at one end outwardly diverging end faces engageable with the work to be centered relatively to the tool, of visual center-indicating means carried by the device for indicating when the work is centered, said means comprising two independently swingable indicator plates disposed on said other flat faces of said body members, said plates having outwardly-diverging work-engaging edge portions disposed outwardly from said diverging end faces of said body members, means pivotally mounting said plates on said body members in opposed relation, and a pointer for each of said plates movable when its plate is swung, said pointers coacting with respective center marks on said body members.

2. The structure of claim 1 together with spring means on said body members and associated with said plates for independently swinging them in one direction on their pivotal mounting means.

3. The structure of claim 2 in which said plates are elongated and their pivotal mountings are between their ends, and in which said pointers are at the ends of said plates opposite from their said outwardly-diverging work-engaging edge portions.

4. A centering device of the character set forth, comprising two opposed elongated body members each having a substantially flat inner face and a flat side face at right angles to said inner face, longitudinally spaced guides projecting from the inner face of one of said members, the other member having openings to receive said guides and permit it to slide thereon, a bar connecting the outer ends of said guides and carrying a clamping screw to engage and move said slidable member to clamp a cutter between the intermediate portions of the opposed inner faces of said members, a pair of coacting swingable indicator plates pivoted between their ends on the respective flat side faces of said members, and springs associated with said plates to swing them on their pivotal axes, said plates having at one end opposed outwardly diverging work-engaging portions and at their other ends pointers to coact with center marks on said members.

5. The structure of claim 4 in which the springs for swinging said indicator plates are coil springs fixed at one end in sockets in said members and provided with free ends seated in openings in said indicator plates.

6. A centering device of the character set forth, comprising two elongated parallel body members with opposed substantially flat faces to receive a cutter between them and with flat front faces disposed in the same plane which is at right angles to said opposed faces, said body members also having at their upper ends flat outwardly-diverging work-engaging faces, guiding means carried by one of said members for supporting the other for sliding movement toward and from it, means carried by said guiding means for moving the slidable member to clamp a cutter between said opposed faces, a pair of elongated swingable indicator plates pivoted between their ends on said front faces respectively of said members, said plates having their upper ends projecting above said upper ends of said members and formed with outwardly-diverging work-engaging portions, the lower ends of said plates being tapered to form pointers which coact respectively with center marks on the lower portions of said front faces of the members, and a spring on each of said members associated with said plates respectively to independently move them in one direction on their pivotal axes.

7. A centering device of the character set forth, comprising two elongated parallel body members with opposed substantially flat faces to receive a cutter between them and with flat front faces disposed in the same plane which is at right angles to said opposed faces, said body members also having at their upper ends flat outwardly-diverging work-engaging faces, guiding means carried by one of said members for supporting the other for sliding movement toward and from it, means carried by said guiding means for moving the slidable member to clamp a cutter between said opposed faces, a pair of elongated swingable indicator plates pivoted between their ends on said front faces respectively of said members, said plates having their upper ends projecting above said upper ends of said members and formed with outwardly-diverging work-engaging portions, the lower ends of said plates being tapered to form pointers which coact respectively with center marks on the lower portions of said front faces of the members, a spring on each of said members associated with said plates respectively to independently move them in one direction on their pivotal axes, said outwardly-diverging work-engaging portions of said indicator plates being provided with extensions projecting outwardly beyond the outer side faces of said members, and flat extension plates detachably connected to the outwardly-diverging upper ends of said members.

CLARENCE A. BRELSFORD.

REFERENCES CITED

The following references are of record in the file of this patent:

UNITED STATES PATENTS

| Number | Name | Date |
|---|---|---|
| 407,617 | Seaver | July 23, 1889 |
| 887,068 | Collinet et al. | May 12, 1908 |
| 1,129,705 | Messier | Feb. 23, 1915 |
| 1,249,584 | Wycislo | Dec. 11, 1917 |
| 1,280,138 | Blair | Oct. 1, 1918 |
| 1,422,746 | Couse | July 11, 1922 |
| 2,360,421 | Hohmann | Oct. 17, 1944 |
| 2,379,406 | Alvis | July 3, 1945 |